(12) United States Patent
Tanaka

(10) Patent No.: US 7,788,672 B2
(45) Date of Patent: Aug. 31, 2010

(54) SYSTEM FOR CONTROLLING ASSIGNMENT OF A PLURALITY OF MODULES OF A PROGRAM TO AVAILABLE EXECUTION UNITS BASED ON SPECULATIVE EXECUTING AND GRANULARITY ADJUSTING

(75) Inventor: Yasuyuki Tanaka, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/419,114

(22) Filed: Apr. 6, 2009

(65) Prior Publication Data

US 2009/0328049 A1    Dec. 31, 2009

(30) Foreign Application Priority Data

Jun. 27, 2008   (JP)   ............... 2008-169084

(51) Int. Cl.
 G06F 9/46   (2006.01)
 G06F 9/30   (2006.01)
 G06F 9/44   (2006.01)

(52) U.S. Cl. .................. 718/106; 718/102; 718/104; 717/149; 717/151; 717/152; 717/153; 712/216; 712/235; 712/239

(58) Field of Classification Search .......... 718/102, 718/104, 106; 717/149, 151, 152, 153; 712/216, 712/235, 239

See application file for complete search history.

(56) References Cited

U.S. PATENT DOCUMENTS

| | | | | |
|---|---|---|---|---|
| 5,526,499 | A | * | 6/1996 | Bernstein et al. ............ 712/216 |
| 6,487,577 | B1 | * | 11/2002 | Sundararajan ............... 718/102 |
| 6,854,048 | B1 | * | 2/2005 | Dice ........................... 712/216 |
| 7,058,945 | B2 | | 6/2006 | Ichinose et al. | |
| 7,493,607 | B2 | * | 2/2009 | Moritz ......................... 717/151 |

(Continued)

FOREIGN PATENT DOCUMENTS

JP    2002-49603    2/2002

(Continued)

OTHER PUBLICATIONS

Lin et al., "A Compiler Framework for Speculative Analysis and Optimizations", ACM, 2003, pp. 289-299.*

(Continued)

Primary Examiner—Meng-Ai An
Assistant Examiner—Jennifer N To
(74) Attorney, Agent, or Firm—Blakely, Sokoloff, Taylor & Zafman, LLP

(57) ABSTRACT

According to one embodiment, an information processing apparatus includes a plurality of execution modules and a scheduler which controls assignment of a plurality of basic modules to the plurality of execution modules. The scheduler includes assigning, when an available execution module which is not assigned any basic modules exists, a basic module which stands by for completion of execution of other basic module to the available execution module, measuring an execution time of processing of the basic module itself, measuring execution time of processing for assigning the basic module to the execution module, and performing granularity adjustment by linking two or more basic modules to be successively executed according to the restriction of a execution sequence so as to be assigned as one set to the execution module and redividing the linked two or more basic modules, based on the two execution measured execution times.

6 Claims, 7 Drawing Sheets

U.S. PATENT DOCUMENTS

| | | | |
|---|---|---|---|
| 7,526,637 B2 * | 4/2009 | Jung et al. | 712/241 |
| 7,559,062 B2 * | 7/2009 | Code et al. | 718/102 |
| 2004/0010782 A1 * | 1/2004 | Moritz | 717/151 |
| 2004/0268095 A1 * | 12/2004 | Shpeisman et al. | 712/225 |
| 2005/0144602 A1 * | 6/2005 | Ngai et al. | 717/151 |
| 2006/0101416 A1 * | 5/2006 | Callahan et al. | 717/128 |
| 2007/0130568 A1 * | 6/2007 | Jung et al. | 718/104 |
| 2007/0204260 A1 * | 8/2007 | Ishizuka | 717/162 |
| 2007/0288912 A1 * | 12/2007 | Zimmer et al. | 717/148 |

FOREIGN PATENT DOCUMENTS

| | | |
|---|---|---|
| JP | 2003-323304 | 11/2003 |
| JP | 2004-062686 | 2/2004 |
| JP | 2004-78617 | 3/2004 |
| JP | 2005-258920 | 9/2005 |

OTHER PUBLICATIONS

Burke et al., "Interprocedure Optimization: Elimiating Unnecessary Recompilation", ACM, 1993, pp. 367-399.*

* cited by examiner

SYSTEM FOR CONTROLLING ASSIGNMENT OF A PLURALITY OF MODULES OF A PROGRAM TO AVAILABLE EXECUTION UNITS BASED ON SPECULATIVE EXECUTING AND GRANULARITY ADJUSTING

CROSS-REFERENCE TO RELATED APPLICATIONS

This application is based upon and claims the benefit of priority from Japanese Patent Application No. 2008-169084, filed Jun. 27, 2008, the entire contents of which are incorporated herein by reference.

BACKGROUND

1. Field

One embodiment of the present invention relates to a program granularity adjustment technique suitable for, e.g., a computer that mounts a CPU including a plurality of CPU cores or a computer that mounts a plurality of CPUs.

2. Description of the Related Art

In recent years, various types of computers (personal computers) for private use, such as notebook type computers and desktop type computers have prevailed. For such computers, a demand for the information processing capability has been increasing close to the limit of the CPU performance improvement. For example, there is a demand for playing back high resolution moving image data by software.

To meet such demand, for example, computers which mount a plurality of CPUs or, in these days, a CPU including a plurality of CPU cores have become available. These computers shorten the turnaround time and improve the performance by processing programs in parallel. Various mechanisms for efficiently processing programs in parallel have been proposed (see, e.g., Jpn. Pat. Appln. KOKAI Publication No. 2005-258920).

One parallel program processing technique comprises two components, i.e., runtime processing including a scheduler which assigns processing units in the program to execution units (when a computer mounts a plurality of CPUs, the scheduler assigns the processing units to the CPUs, and when a computer mounts a CPU including a plurality of CPU cores, the scheduler assigns the processing units to the CPU cores), and a processing unit processed on each execution unit. Note that the size of the processing unit is referred to as the granularity of parallel processing. It is possible to increase the opportunity of parallelization by decreasing the granularity, thereby improving the parallel performance.

On the other hand, if the granularity of parallel processing is too small, the number of operations of the scheduler becomes large and it therefore becomes impossible to obtain adequate performance due to too high an overhead.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing apparatus includes a plurality of execution modules and a scheduler which controls assignment of a plurality of basic modules to the plurality of execution modules. The scheduler includes assigning, when an available execution module which is not assigned any basic modules exists, a basic module which stands by for completion of execution of other basic module to the available execution module; measuring an execution time of processing of the basic module itself; measuring execution time of processing for assigning the basic module to the execution module; and performing granularity adjustment by linking two or more basic modules to be successively executed according to the restriction of a execution sequence so as to be assigned as one set to the execution module and redividing the linked two or more basic modules, based on the two execution measured execution times.

Figure 1:
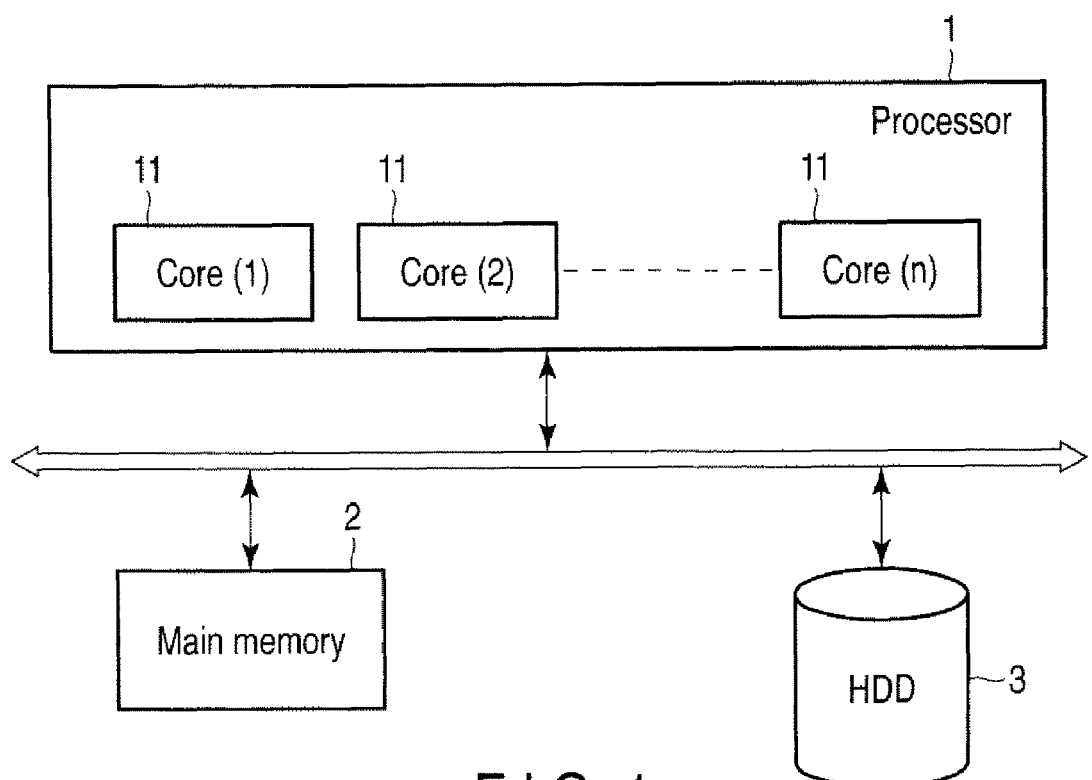
FIG. 1 is an exemplary view showing a system configuration of an information processing apparatus according to an embodiment of the invention.

FIG. 1 is an exemplary view showing a system configuration of an information processing apparatus according to the embodiment. The information processing apparatus is implemented as a so called personal computer such as a notebook type computer or desktop type computer. As shown in FIG. 1, this computer includes a processor 1, main memory 2, and hard disk drive (HDD) 3, which are interconnected via an internal bus.

The processor 1 serves as a central processing unit (CPU) which controls the execution of a program loaded in the main memory from the HDD 3, and includes a plurality of cores 11 serving as main arithmetic circuits (CPU cores).

The main memory 2 is e.g., a semiconductor storage device, and can be accessed by the processor 1. The HDD 3 is a low speed mass storage device (in comparison with the main memory 2) serving as an auxiliary storage in the computer.

Although not shown in FIG. 1, input/output devices such as a display for displaying the processing result of the program executed by the processor 1 and the like, and a keyboard for inputting process data and the like are provided for, e.g., a notebook type computer, or are externally connected via cables for, e.g., a desktop type computer.

The computer which mounts the processor 1 including the plurality of cores 11 can execute a plurality of programs in parallel, and also execute a plurality of processes in one program in parallel. The schematic configuration of a program which is based on parallel processing specifications and executed by the computer will be described with reference to FIG. 2.

Figure 2:
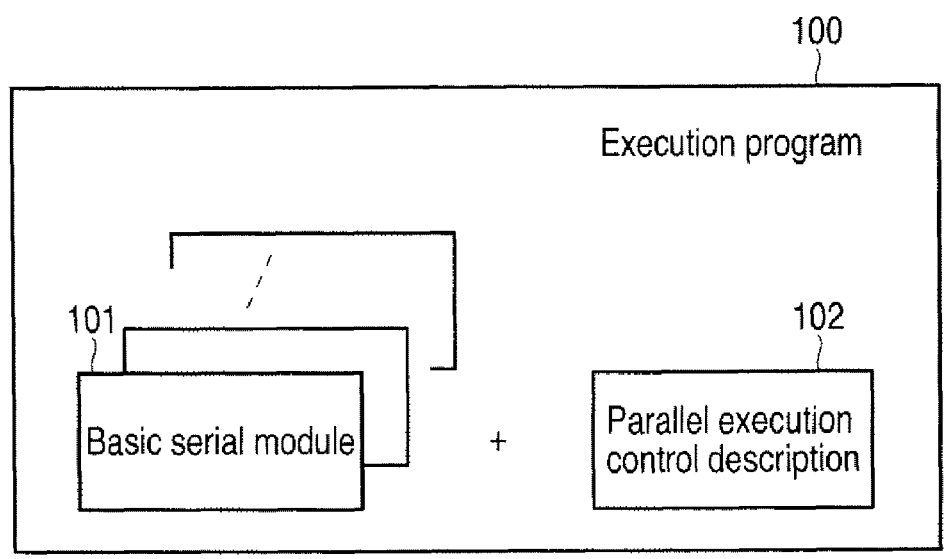
FIG. 2 is an exemplary view for explaining the schematic configuration of a program based on parallel processing specifications, which is executed by the information processing apparatus according to the embodiment.

As shown in FIG. 2, an execution program 100 which is based on parallel processing specifications and executed by the computer includes a plurality of basic serial modules 101, and a parallel execution control description 102 which defines an order of executing the plurality of basic serial modules 101.

Figure 3:
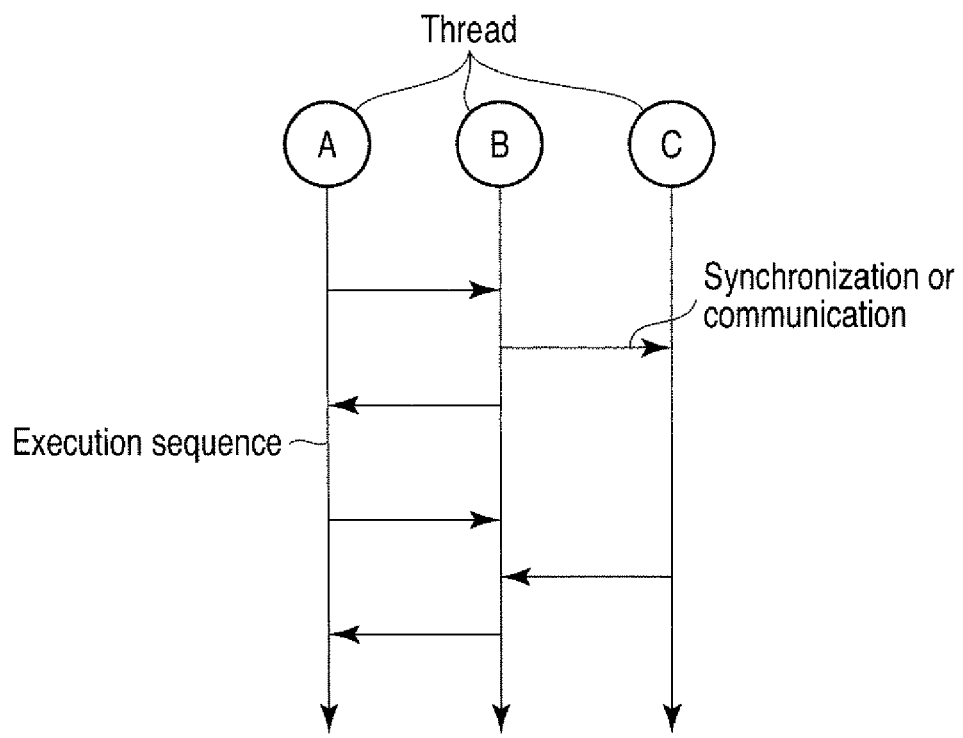
FIG. 3 is an exemplary view showing general multi thread processing.

In so-called multi-thread processing, as shown in FIG. 3, each thread progresses while synchronizing with other threads (including communication), i.e., maintaining the consistency of the program as a whole. If the frequency of waiting for synchronization is high, it may be impossible to obtain the parallel performance expected.

Figure 4:
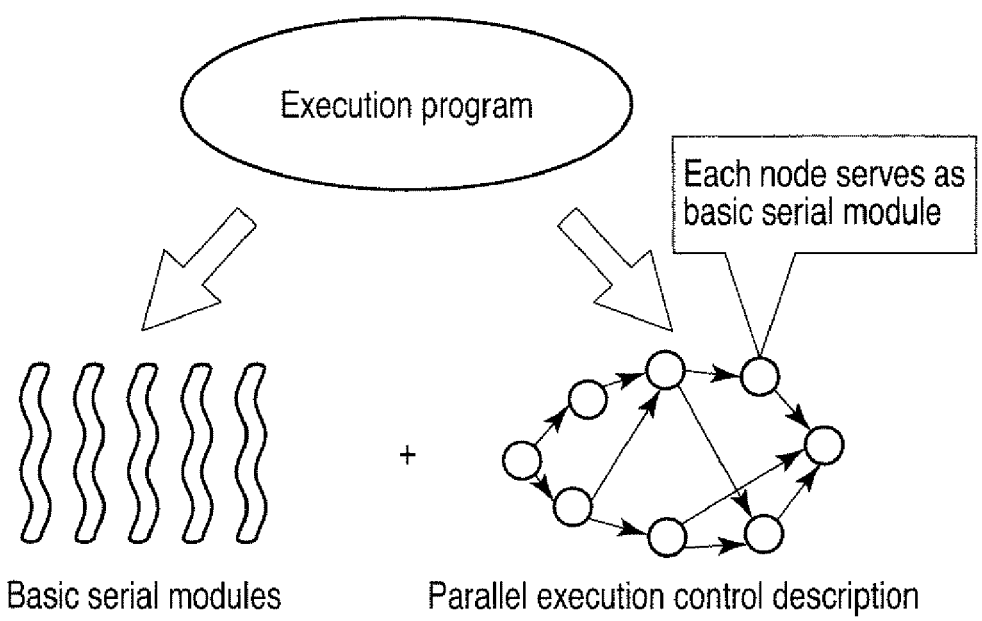
FIG. 4 is an exemplary view showing the relationship between basic serial modules and a parallel execution control description which are included in the program executed by the information processing apparatus according to the embodiment.

In this embodiment, as shown in FIG. 4, by dividing a program into processing units which need not synchronize with other modules and thus can be asynchronously executed, a plurality of basic serial modules 101 are created while a parallel execution control description 102 which defines a temporal execution rule for the plurality of basic serial modules 101 is created. Under the parallel execution control, each of the basic serial modules 101 is represented as a node. As explained above, a basic serial module indicates a module as a processing unit which can be executed asynchronously with other modules. The parallel execution control description 102 will be described next with reference to FIG. 5.

Figure 5:
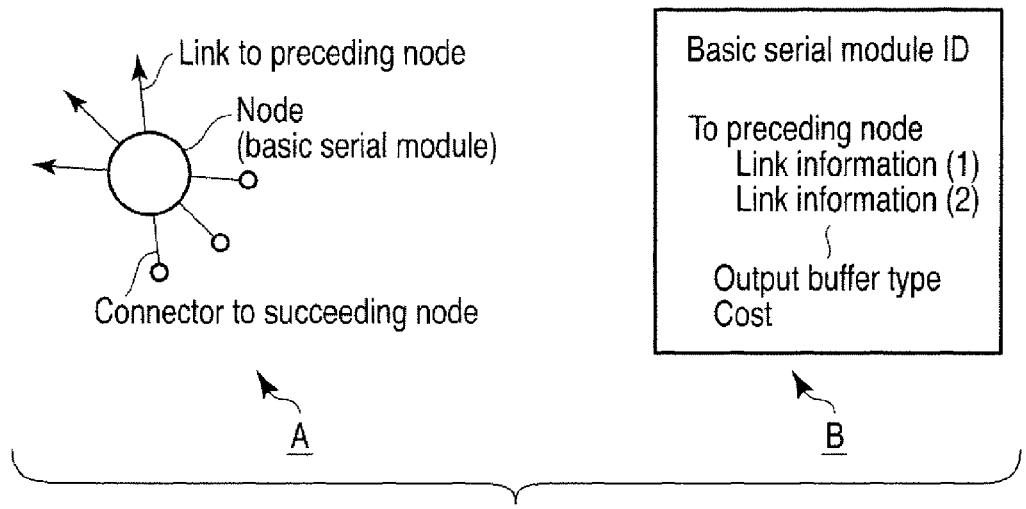
FIG. 5 is an exemplary view for explaining the parallel execution control description of the program executed by the information processing apparatus according to the embodiment.

Reference symbol "A" in FIG. 5 denotes a schematic node representing one of the basic serial modules 101. As shown in FIG. 5, each of the basic serial modules 101 can be considered as a node having links to preceding nodes and connectors to succeeding nodes. The parallel execution control description 102 defines an order of executing the plurality of basic serial modules 101 by describing link information on preceding nodes with respect to each of the basic serial modules 101. Reference symbol "B" in FIG. 5 denotes a parallel execution control description associated with one of the basic serial modules 101. As shown in FIG. 5, the description describes a basic serial module ID serving as an identifier for the basic serial module 101, and link information on the preceding nodes of the basic serial module 101. Also, the description describes information on an output buffer type, cost, and the like.

A method by which the computer executes the execution program 100 having a unique configuration in that the plurality of basic serial modules 101 and the parallel execution control description 102 are included will now be described.

Figure 6:
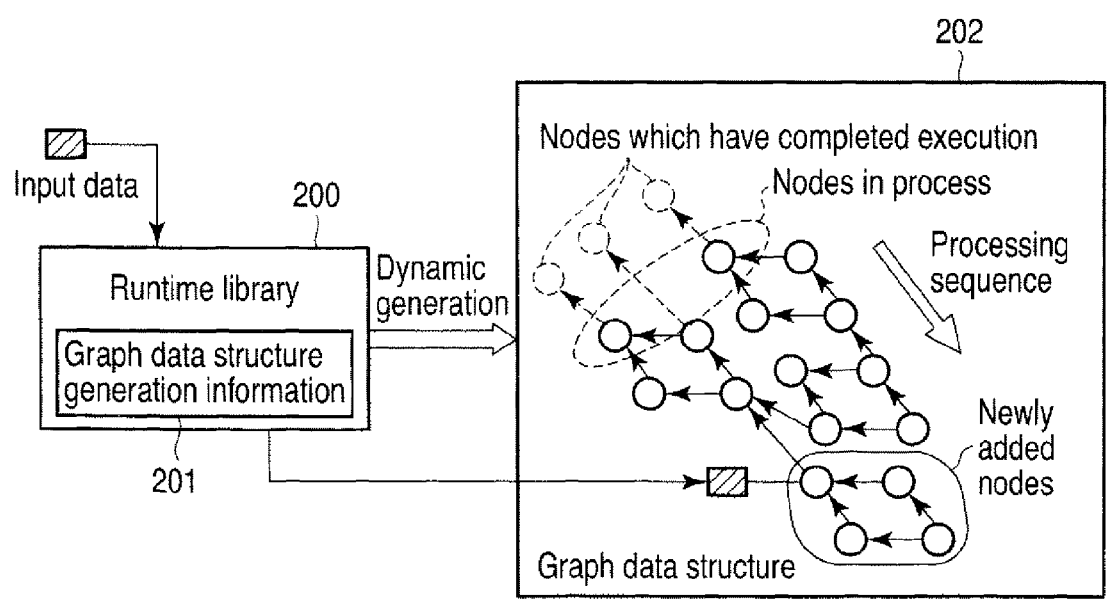
FIG. 6 is an exemplary view for explaining the parallel processing control of the program, which is executed by a runtime library operating on the information processing apparatus according to the embodiment.

To execute, in parallel, the execution program 100 having such unique configuration, a runtime library 200 shown in FIG. 6 is prepared in the computer. The runtime library 200 includes a scheduler function, and is provided with the parallel execution control description 102 as graph data structure generation information 201. The parallel execution control description 102 is created by, e.g., using a functional programming language, and translated into the graph data structure generation information 201 by a translator.

When data is input, there is a need for executing some of the basic serial modules 101 for processing the data. Each time the need arises, the runtime library 200 dynamically generates/updates a graph data structure 202 on the basis of the graph data structure generation information 201. The graph data structure 202 is graph data representing the relationship between preceding and succeeding nodes to be executed, as needed. The runtime library 200 adds the nodes to the graph data structure 202 in consideration of the relationship between preceding and succeeding nodes in an execution standby state as well as the relationship between the preceding and succeeding nodes to be added.

Upon completion of the execution of a node, the runtime library 200 deletes the node from the graph data structure 202, checks the presence/absence of a succeeding node which has the node as a preceding node and which does not have other preceding nodes or of which all other preceding nodes have been completed. If there exists a succeeding node which satisfies this condition, the runtime library 200 assigns the node to one of the cores 11.

Figure 7:
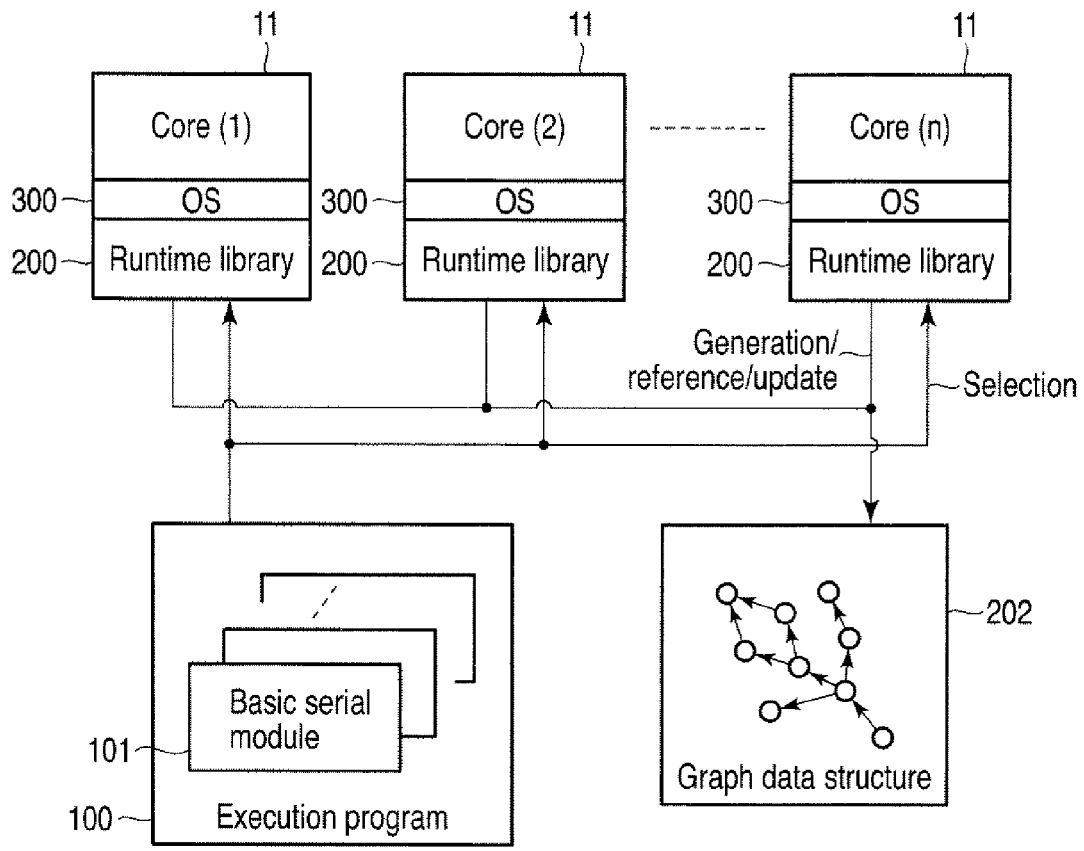
FIG. 7 is an exemplary view showing the operation state of the runtime libraries on the information processing apparatus according to the embodiment.

With this operation of the runtime library 200, the parallel execution of the plurality of basic serial modules 101 progresses on the basis of the parallel execution control description 102 without contradiction. The runtime library 200 executes the processing by using more threads than the number of cores 11 built in the processor 1 (multi thread). As a result, as shown in FIG. 7, it is possible to operate the computer as if each core 11 (the runtime library 200 as a thread under the control of an OS 300 of the corresponding core 11) had autonomously found one basic serial module 101 to be executed next. Exclusive control between the threads is executed only for the runtime library 200 to select a node from the graph data structure 202 and update the graph data structure 202. Therefore, in comparison with the general multi thread processing shown in FIG. 3, the processing according to the embodiment achieves a higher parallel performance.

If the processing unit of the basic serial modules 101, i.e., the granularity of parallel processing is too small with respect to the number of the cores 11 built in the processor 1 of the computer, the operation opportunity of the runtime library 200, i.e., a so-called overhead increases, and therefore the execution efficiency may decrease. In consideration of this, the runtime library 200 of this embodiment further comprises a function of efficiently adjusting the granularity of parallel processing upon execution.

Figure 8:
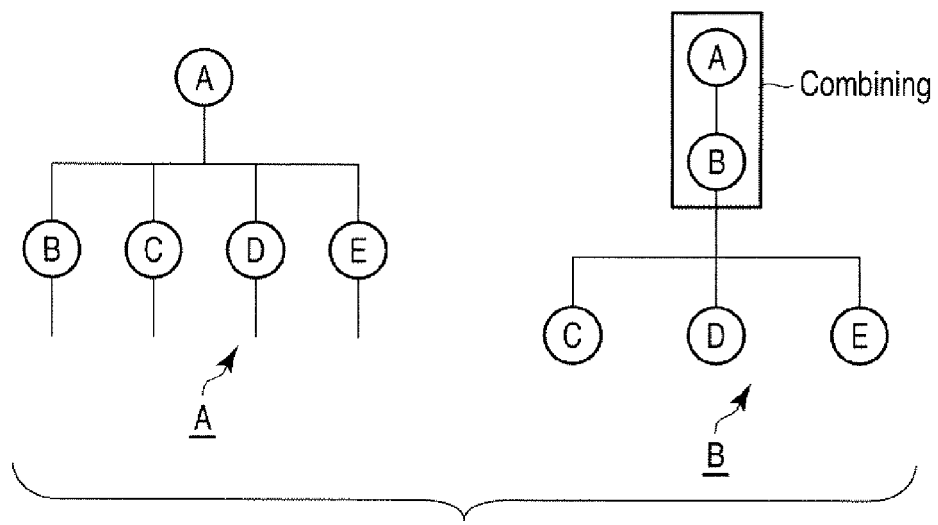
FIG. 8 is an exemplary view for explaining node linking processing executed by the runtime library operating on the information processing apparatus according to the embodiment.

More specifically, assume that five nodes exist, i.e., node "A" to node "E" having the relationship denoted by reference symbol "A" in FIG. 8. The runtime library 200 comprises a function of linking node "A" and node "B", and changing the preceding node of node "C" to node "E" from node "A" to node "B", as denoted by reference symbol "B" in FIG. 8.

However, linking nodes may decrease the parallel processing performance, contrary to expectation. This applies to a case in which the characteristics of input data to be processed change and the load balance of modules changes. In consideration of this, the runtime library 200 also includes a function of redividing, as denoted by reference symbol "A" in FIG. 8, nodes "A" and "B" which have been linked as denoted by reference symbol "B" in FIG. 8.

Figure 9:
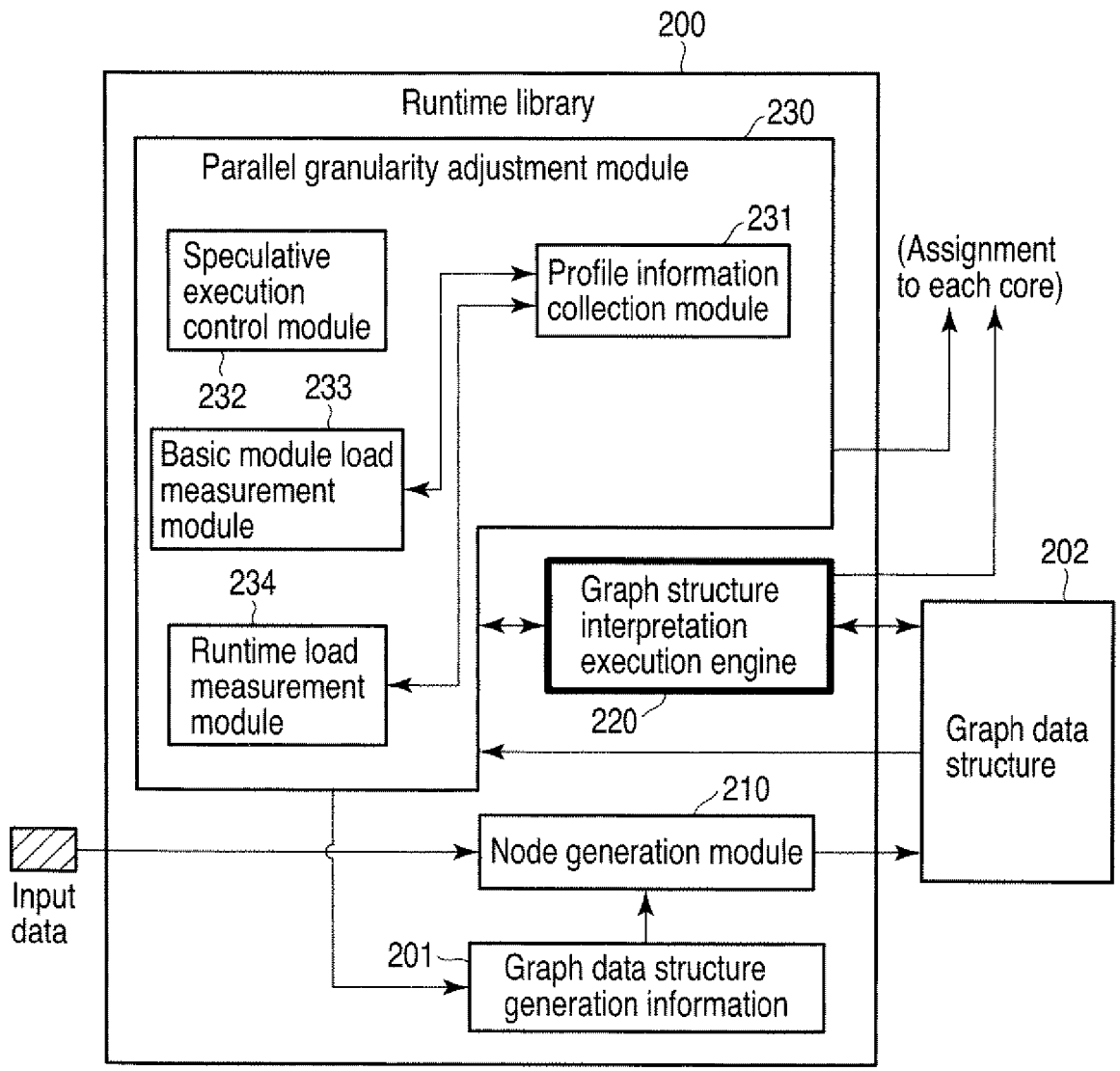
FIG. 9 is an exemplary functional block diagram of the runtime library operating on the information processing apparatus according to the embodiment.

FIG. 9 is an exemplary functional block diagram showing the runtime library 200.

As shown in FIG. 9, the runtime library 200 includes a node generation module 210, graph structure interpretation execution engine 220, and parallel granularity adjustment module 230.

The node generation module 210 and graph structure interpretation execution engine 220 implement the above described dynamic generation/update of the graph data structure 202 on the basis of the graph data structure generation information 201 and the above described control of assigning nodes to the cores 11 using the graph data structure 202, both of which are executed by the runtime library 200. The parallel granularity adjustment module 230 implements efficient granularity adjustment (to be described in detail below) in executing the programs processed in parallel. The parallel granularity adjustment module 230 includes a profile information collection module 231, speculative execution control module 232, basic module load measurement module 233, and runtime load measurement module 234.

The basic module load measurement module 233 measures the processing execution time (basic module execution time) of each of the basic serial modules 101. The runtime load measurement module 234 measures the execution time (runtime execution time) of processing which is performed by the runtime library 200 to assign each of the basic serial modules 101 to one of the cores 11. The profile information collection module 231 systematically manages the measurement information acquired in the basic module load measurement module 233 and runtime load measurement module 234.

The parallel granularity adjustment module 230 performs the granularity adjustment of the execution program 100 on the basis of the measurement information managed by the profile information collection module 231. More particularly, the following granularity adjustment is performed:

(1) If the average of the basic module execution times<the runtime execution time, the granularity is increased.

(2) If the average of the basic module execution times>>the runtime execution time, the granularity is decreased.

If a computer mounts the processor 1 including the plurality of cores 11 like the computer according to this embodiment, it is possible to execute the plurality of basic serial modules 101 in parallel, thereby enhancing the speed. However, not all the cores 11 are always executing the basic serial modules 101. This is because some of the basic serial modules 101 may be standing by for completion of executing other basic serial modules 101 to allow the parallel execution of the basic serial modules 101 to progress based on the parallel execution control description 102 without contradiction.

The parallel granularity adjustment module 230 of the runtime library 200 operating on the computer utilizes, for adjusting the granularity of the execution program 100, the cores 11 which are available due to such situation. To do this, the parallel granularity adjustment module 230 includes the speculative execution control module 232.

The basic serial module 101 for which preceding nodes have all been completed and which is thus in an executable state is referred to as a basic serial module 101 without any precedence constraints. The basic serial module 101 for which preceding nodes have not been completed and which is thus in a standby state is referred to as a basic serial module 101 with precedence constraints.

If there exists an available core 11, the speculative execution control module 232 assigns the basic serial module 101 with precedence constraints to the available core 11 independently of the cores 11 originally assigned to the execution program 100. For example, data created for a test are prepared in advance, and are temporarily given as input parameters. Execution by the basic serial module 101 which does not consider the result is referred to as speculative execution in this specification.

The basic serial module 101 without any precedence constraints is immediately assigned to the core 11 to be executed. The basic module load measurement module 233, therefore, measures a basic module execution time, and the runtime load measurement module 234 measures a runtime execution time. The parallel granularity adjustment module 230 then adjusts the granularity as needed. In addition to this, if there exists an available core 11 in the computer, the basic serial module 101 with precedence constraints is assigned to the available core 11 to be subjected to speculative execution. The basic module load measurement module 233, therefore, measures a basic module execution time, and the runtime load measurement module 234 measures a runtime execution time. The parallel granularity adjustment module 230 then adjusts the granularity as needed.

That is, in executing the execution program 100 in parallel, the available cores 11 are utilized for adjusting the granularity of the execution program 100.

The execution program 100 is preferentially executed over the speculative execution for the granularity adjustment. Assume that during the speculative execution of the basic serial module 101 with precedence constraints, one of the basic serial modules 101 becomes that without any precedence constraints. In this case, to preferentially execute such basic serial module 101, the speculative execution control module 232 stops the speculative execution of the basic serial module 101 with precedence constraints, and releases the corresponding core 11.

Assume that after the execution of the execution program 100 starts, all the basic serial modules 101 are executed as one set. The speculative execution control module 232 continues the speculative execution of the basic serial module 101 with precedence constraints until the basic serial modules 101 are executed by a specified number of sets (with which it is expected to attain adequate granularity adjustment). The runtime library 200 can accept the setting of the valid/invalid state of the speculative execution control module 232 of the parallel granularity adjustment module 230. The runtime library 200 can set the speculative execution control module 232 to the valid state when, e.g., exchanging the processor 1 (for a processor 1 including a different number of cores 11).

Operation procedures associated with the granularity adjustment in executing the execution program 100 by the computer will be explained next with reference to FIG. 10, FIG. 11 and FIG. 12.

Figure 10:
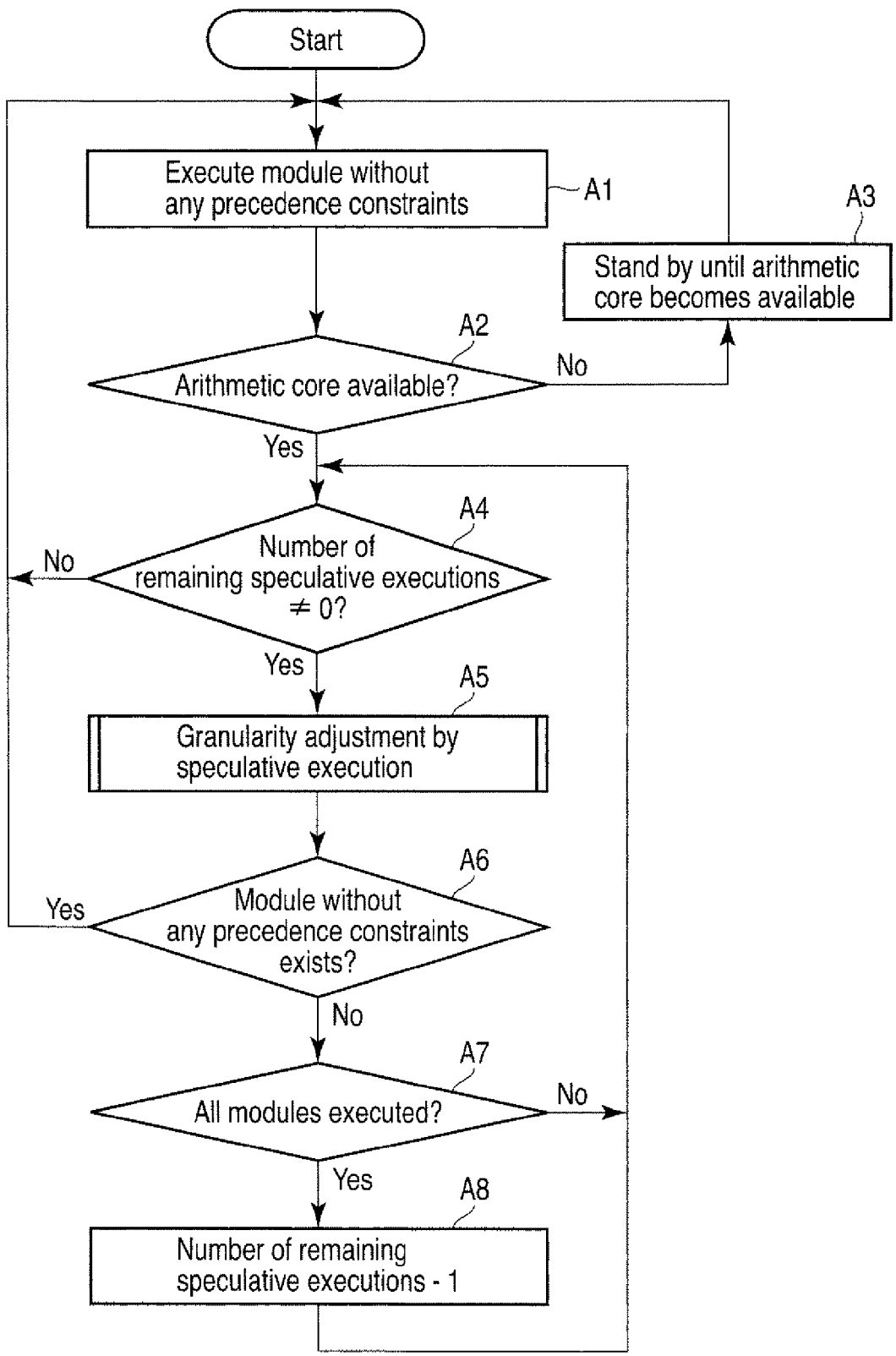
FIG. 10 is an exemplary first flowchart showing the operation sequence of parallel processing optimization executed by the runtime library operating on the information processing apparatus according to the embodiment.

First, the graph structure interpretation execution engine 220 of the runtime library 200 assigns the basic serial module 101 without any precedence constraints in the graph data structure 202 to the core 11 (block A1 of FIG. 10). The runtime library 200 monitors whether or not an available core 11 is present (block A2 of FIG. 10). If there is no available core 11 (NO in block A2 of FIG. 10), the runtime library 200 stands by until a core 11 becomes available (block A3 of FIG. 10).

Assume that there is an available core 11 (YES in block A2 of FIG. 10). In this case, if the basic serial modules 101 are not executed by the specified number of sets (NO in block A4 of FIG. 10), the speculative execution control module 232 of the parallel granularity adjustment module 230 executes the granularity adjustment by speculative execution (block A5 of FIG. 10), for which a sequence is shown in detain in FIG. 12.

Figure 11:
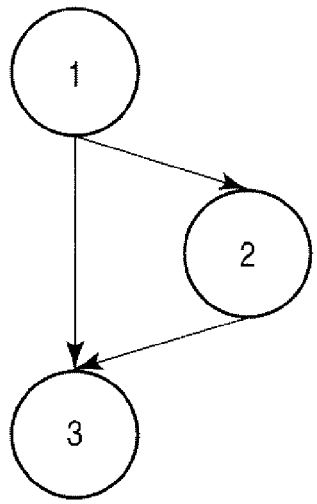
FIG. 11 is an exemplary view showing a speculative execution of basic serial modules, which is performed by the runtime library operating on the information processing apparatus according to the embodiment.

For example, if there exists the graph data structure 202 as shown in FIG. 11, a basic serial module 101 (2) has precedence constraints that the execution of a basic serial module 101 (1) is complete, and a basic serial module 101 (3) has precedence constraints that the execution of the basic serial module 101 (1) and basic serial module 101 (2) is complete. During the execution of the basic serial module 101 (1), therefore, even if an available core 11 exists, execution of both the basic serial module 101 (2) and the basic serial module 101 (3) cannot start.

Figure 12:
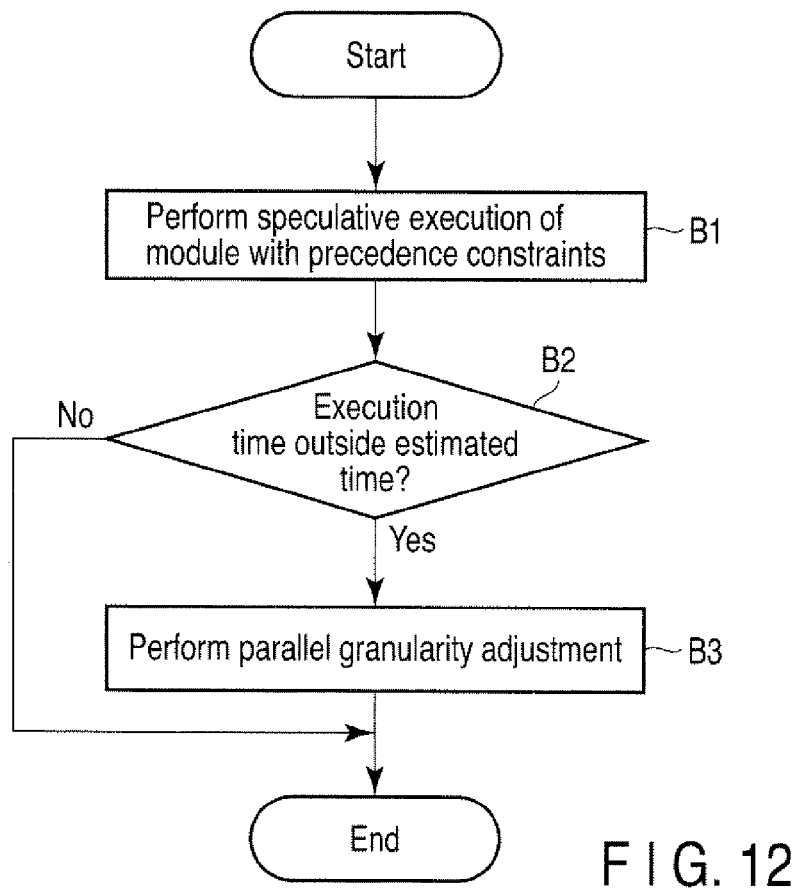
FIG. 12 is an exemplary second flowchart showing the operation sequence of parallel processing optimization executed by the runtime library operating on the information processing apparatus according to the embodiment.

In this case, if, in this set, either of the basic serial module 101 (2) and the basic serial module 101 (3) is not executed, the speculative execution control module 232 assigns the corresponding basic serial module 101 to the available core 11 for speculative execution (block B1 of FIG. 12). With this speculative execution, the basic module load measurement module 233 measures a basic module execution time, and the runtime load measurement module 234 measures a runtime execution time. If the basic module execution time does not match an estimated time with respect to the runtime execution time (YES in block B2 of FIG. 12), the parallel granularity adjustment module 230 executes the parallel granularity adjustment of the basic serial module 101 for which the speculative execution has been performed (block B3 of FIG. 12).

The runtime library 200 monitors whether there is a basic serial module 101 which has transited to that without any precedence constraints (block A6 of FIG. 10). If there is such a basic serial module 101 (YES in block A6 of FIG. 10), the runtime library 200 stops the speculative execution, and starts executing the basic serial module 101 without any precedence constraints (block A1 of FIG. 10); otherwise (NO in block A6 of FIG. 10), the parallel granularity adjustment module 230 checks whether all the basic serial modules 101 are executed in this set (block A7 of FIG. 10). If all the modules are executed (YES in block A7 of FIG. 10), the number of remaining sets is decremented by one (block A8 of FIG. 10). The parallel granularity adjustment module 230 rechecks whether the basic serial modules 101 are executed by the specified number of sets (block A4 of FIG. 10). If the basic serial modules 101 are not executed by the specified number of sets (YES in block A4 of FIG. 10), the parallel granularity adjustment module 230 continues the speculative execution of the basic serial module 101 with precedence constraints.

When linking nodes, the parallel granularity adjustment module 230 generates new graph data structure generation information 201 having as attribute information the nodes to be linked. The information to be newly generated is information pertaining to a node for successively executing two basic serial modules 101 on the same core 11, and its link information is obtained by merging the link information of the two nodes. The node to be newly created corresponds to a logical basic serial module 101 which regards the two basic serial modules 101 as one module.

At this time, the parallel granularity adjustment module 230 rewrites the link information of other nodes which refers to these two nodes with the newly generated node. With this operation, the node generation module 210 adds nodes to the graph data structure 202 using the newly generated graph data structure generation information 201 from then on.

Since the basic serial modules 101 corresponding to the linked node are successively executed on the same core 11, the parallel granularity adjustment module 230 optimizes compilers including scheduling instructions, reassigning parameters to registers, etc. within the range of this core in order to transform those processes for efficiently processing.

With this operation of the parallel granularity adjustment module 230, the runtime library 200 implements efficient self adjustment of the granularity of the execution program 100 upon execution. According to this method (in which the granularity of parallel processing is self adjusted upon execution), the basic serial modules 101 are divided into small enough processing units without considering the granularity in creating the execution program 100. It is therefore possible to omit the operation of adjusting or recreating the execution program 100 for each of the cores 11.

Although the method in which the computer mounts the processor 1 including the plurality of cores 11 has been described by way of example in this embodiment, the method is also applicable to a so called multiprocessor computer mounting a plurality of processors 1, as a matter of course.

Modification can be made so that the speculative execution control module 232 performs speculative execution only for, e.g., the basic serial modules 101 in which input parameters are changed. The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
a plurality of execution modules being either central processing unit (CPU) cores built in a CPU or a plurality of CPUs formed individually of each other; and
a scheduler configured to control assignment of a plurality of basic modules to the execution modules based on a restriction of an execution sequence in order to execute a program in parallel using the execution modules, the program being divided into the basic modules executable asynchronously with each other, the program defining the restriction of the execution sequence for sequentially executing the basic modules;
the scheduler including:
a speculative execution control module configured to assign, when the execution modules contain an execution module to which no basic modules are assigned, one of the basic modules to the execution module independently of the parallel execution of the program to experimentally execute the one basic module, the one basic module standing by for completion of execution of one of the other basic modules in accordance with the restriction of the execution sequence;
a basic module load measurement module configured to measure an execution time of each of the basic modules;
a runtime load measurement module configured to measure an execution time required for assigning each of the basic modules to the execution modules; and a granularity adjustment module configured to perform granularity adjustment by linking at least two of the basic modules to be successively executed according to the restriction of the execution sequence so as to be assigned as one set to the execution module and by redividing the at least two linked basic modules, based on the execution time measured by the basic module load measurement module and the execution time measured by the runtime load measurement module.

2. The information processing apparatus of claim 1, wherein the speculative execution control module stops experimental execution of the one basic module to release the execution module, when another of the basic modules transits from a standby state to an executable state during experimental execution of the one basic module.

3. The information processing apparatus of claim 1, wherein the speculative execution control module continues the experimental execution of the one basic module until each basic module is executed a specified number of times and the basic module load measurement module measures the execution time the specified number of times for each basic module.

4. The information processing apparatus of claim 1, wherein the speculative execution control module regards the one basic module as a target of the experimental execution of the basic module when the one basic module has an input parameter thereof changed.

5. The information processing apparatus of claim 1, further comprising a recording medium which stores the program, wherein the execution modules execute the basic modules of the program read from the recording medium.

6. A granularity adjustment method for an information processing apparatus which includes a scheduler configured to control assignment of a plurality of basic modules to a plurality of execution modules based on a restriction of an execution sequence, and which executes a program in parallel using the execution modules, the program being divided into the basic modules executable asynchronously with each other, the program defining the restriction of the execution sequence for sequentially executing the basic modules, the method comprising:

assigning, when the execution modules contain an execution module to which no basic modules are assigned, one of the basic modules to the execution module independently of the parallel execution of the program to experimentally execute the one basic module, the one basic module standing by for completion of execution of one of the other basic modules in accordance with the restriction of the execution sequence, by a speculative control module included in the scheduler;

measuring an execution time of each of the basic modules by the scheduler;

measuring an execution time required for assigning each of the basic modules to the execution modules by the scheduler; and performing granularity adjustment by linking at least two of the basic modules to be successively executed according to the restriction of a execution sequence so as to be assigned as one set to the execution module and by redividing the at least two linked basic modules, based on two of the measured execution times by the scheduler.

* * * * *